United States Patent [19]

Gleichauf

[11] Patent Number: 5,238,205
[45] Date of Patent: Aug. 24, 1993

[54] MOUNTING STRUCTURE FOR A PROPULSION UNIT IN A MODEL AIRPLANE

[76] Inventor: Rolf Gleichauf, Zeppelinstrasse 12, D-7710 Donaueshingen, Fed. Rep. of Germany

[21] Appl. No.: 865,534

[22] Filed: Apr. 9, 1992

[30] Foreign Application Priority Data

Apr. 12, 1991 [DE] Fed. Rep. of Germany ... 9104493[U]

[51] Int. Cl.$^5$ ............................................. B64D 27/00
[52] U.S. Cl. ........................................ 244/54; 446/57
[58] Field of Search ...................... 244/54; 446/56, 57, 446/178; 415/210.1, 142; 417/360; 248/554, 555, 556, 557

[56] References Cited

U.S. PATENT DOCUMENTS

| 1,450,282 | 4/1923 | Fox | 446/57 |
| 1,705,492 | 3/1929 | Noble | 248/554 |
| 1,723,012 | 8/1929 | Caminez | 248/557 |
| 2,460,586 | 2/1949 | Keetch | 248/557 |
| 2,781,165 | 2/1957 | Troller | 417/360 |
| 3,914,899 | 10/1975 | Mabuchi | 446/57 |
| 4,394,111 | 7/1983 | Wiese et al. | 417/360 |
| 4,585,391 | 4/1986 | Vuillet et al. | 415/210.1 |

FOREIGN PATENT DOCUMENTS 2201078 7/1973 Fed. Rep. of Germany ...... 417/360

*Primary Examiner*—Joseph F. Peters, Jr.
*Assistant Examiner*—Anne E. Bidwell
*Attorney, Agent, or Firm*—Gerald E. Linden

[57] ABSTRACT

In a mounting structure for mounting a propulsion unit in a fuselage of a model airplane, the propulsion unit having a motor with a fan which motor is fixed to a generally cylindrical cowl by support columns, the cowl at the opening facing the motor has a radial flange extending to the outside of the cowl, a cylindrical sleeve is provided which is inserted in the opening of the cowl, the sleeve also having a radial flange directed to the outside, and wherein between the flange of the cowl and the flange of the sleeve a gap is formed for receiving a round-frame rib of the airplane body for connecting the propulsion unit and the airplane body.

8 Claims, 4 Drawing Sheets

MOUNTING STRUCTURE FOR A PROPULSION UNIT IN A MODEL AIRPLANE

BACKGROUND OF THE INVENTION

The invention relates to a mounting structure for mounting a propulsion unit in a fuselage of a model airplane.

The U.S. Pat. No. 4,307,857 shows a model airplane the propulsion unit of which plane is accommodated in the interior of the airplane fuselage. The propulsion unit comprises a motor with a fan which motor is fixed to a cowl by means of support columns. This propulsion unit has to be installed at the airplane body as a total unit in the position respectively provided for this purpose in each model. The connection to the airplane body is effected at the cowl, e.g. at a flange formed to the front face thereof. The flange of the cowl is mounted at a round-frame rib disposed in the cross-sectional plane of the airplane fuselage by bolts extending through the flange and the round-frame rib thereby weakening the rib.

Such kind of mounting may, however, give rise to problems, since on one hand the entire propulsion unit must be held in exact position at the rib and on the other hand the propulsive force is introduced into the airplane through the rib. For this reason, a large-area, reliable connection between the cowl of the motor mounting structure and the round-frame rib has to be achieved.

SUMMARY OF THE INVENTION

The invention is based on the object of creating a mounting structure for mounting a propulsion unit in a model airplane, which guarantees a safe and easily mountable connection between the propulsion unit and the airplane body.

This object is solved by mounting structure for a mounting propulsion unit in a fuselage of a model airplane, the propulsion unit comprising a motor with a fan which motor is fixed to a generally cylindrical cowl by means of support columns, wherein said cowl at the opening facing the motor comprises a radial flange extending to the outside of said cowl, a cylindrical sleeve is provided which is inserted in the opening of said cowl, said sleeve also comprising a radial flange directed to the outside, and wherein between said flange of said cowl and said flange of said sleeve a gap is formed for receiving a round-frame rib of the airplane body for connecting the propulsion unit and the airplane body.

The two flanges of the cowl and the sleeve in mounted condition circumscribe the round-frame rib, so that on one hand a secure mounting of the propulsion unit is guaranteed and on the other hand the round-frame rib is reinforced. The roundframe rib, therefore, can be built with smaller dimensions and the mounting structure, nevertheless, shows increased stability. The mounting means for the support columns holding the motor can therein be provided for at the flange of the sleeve.

In a preferred embodiment of the mounting structure according to the present invention said cowl and said sleeve have identical inner diameters and, in the area accommodating said sleeve, said cowl has a stepping (change in diameter) by which the inner diameter of said cowl is enlarged by an amount corresponding to the wall thickness of said sleeve.

In a further preferred embodiment of the mounting structure according to the present invention fixing means are provided for the support column or columns, respectively, for supporting the motor are provided at said sleeve. Thus, the fixing means for the motor are disposed at the most stable position of the mounting structure and can be provided for without showing a negative effect on the of flow properties and the stability.

Further advantageous embodiments of the invention can be seen from the remaining subclaims and from the description that follows.

DETAILED DESCRIPTION OF THE INVENTION

The invention relates primarily to mounting propulsion units (engine, motor) in scale model airplanes, particularly motors of the type employing a ducted fan (propeller), such as is shown in U.S. Pat. No. 4,307,857.

The fuselage (body) of scale model airplanes typically include a series of spaced-apart, round-frame-ribs, or bulkheads, in the interior of the fuselage, which extend circumferentially around the inner diameter of the fuselage. There are typically several of these round-frame-ribs, of varying diameter, disposed along the length of the fuselage, and they are connected together by longitudinal beams, or stringers, disposed in the lengthwise direction from rib-to-rib. Together the (round-frame) ribs and lengthwise beams form a skeletal frame for the fuselage, which is then covered by a paper (e.g., tissue paper) or plastic (e.g., mylar) skin (lining, covering).

In the case of U.S. Pat. No. 4,307,857, the fuselage is formed otherwise, by a solid structure, and a rib (80) is provided in order to mount the motor with a cowl. Also, in this case, ribs like the rib 80 serve to stabilize the fuselage.

Figure 1:
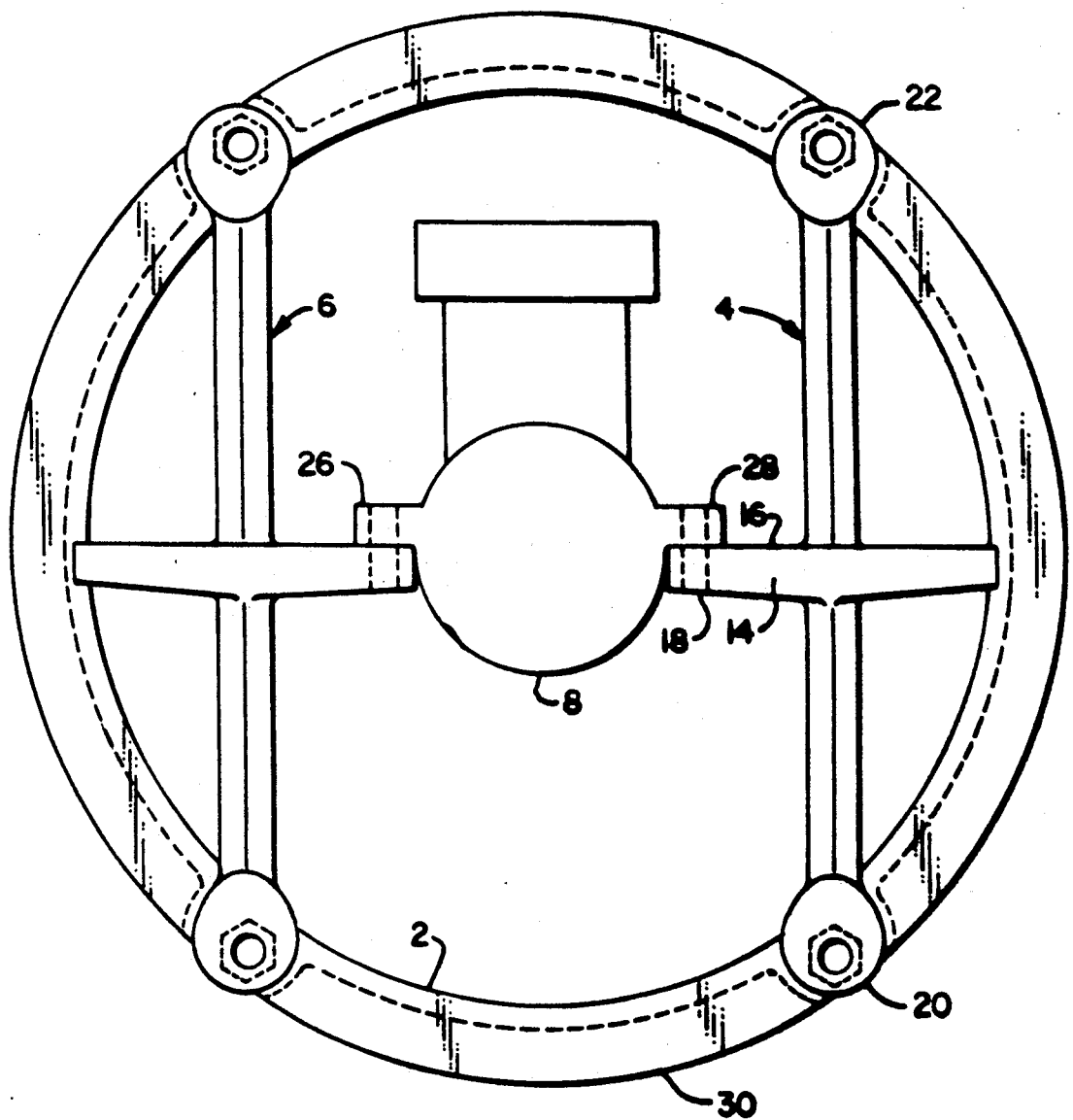
FIG. 1 is an end view of a mounting arrangement for mounting a motor to a cowling, according to the prior art.
Figure 2:
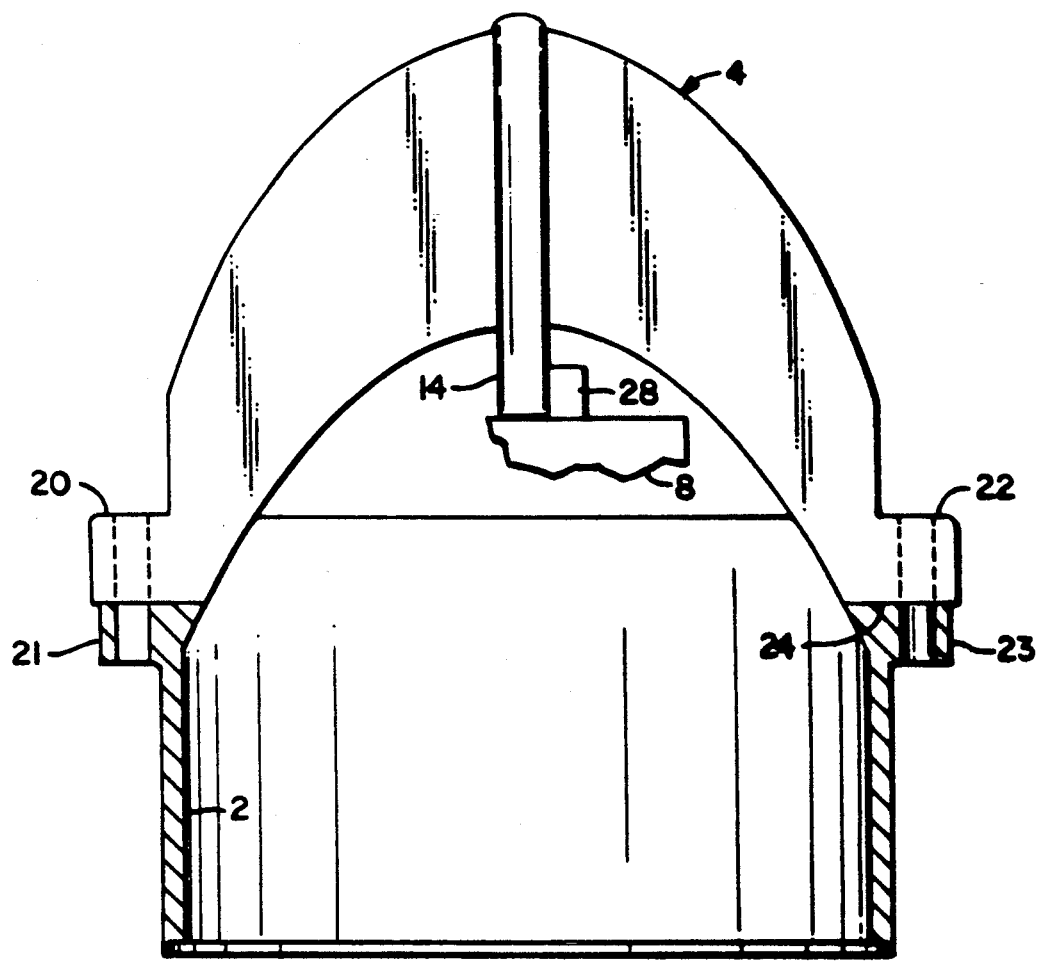
FIG. 2 is a cross-sectional view of the mounting arrangement of FIG. 1.

FIGS. 1 and 2 show a propulsion unit (ducted fan motor) 8 mounted in a cowling (cowl) 2. For clarity of illustration, the fan (propeller) of the motor is not shown. The motor 8 is shown only partially in FIG. 2. As shown in FIG. 1, the motor has two opposed mounting lugs 26 and 28.

As shown in FIGS. 1 and 2, two support columns 4 and 6 are provided, spanning and end 24 of the cowl 2. These support columns are spaced-apart and parallel to each other, and are disposed in a chordwise orientation with respect to the generally circular cross-section of the cowl 2.

The support column 4 has mounting lugs 20 and 22 at its two ends, and therebetween forms an arcuate profile extending beyond the end 24 of the cowl 2. The lugs 20 and 22 are fixed in a suitable manner, such as by bolts, to corresponding lugs 21 and 23 on a radial flange 30 disposed about the circumference of the end 24 of the cowl. The support column 4 is further provided with a cross-wise member 14, extending at ninety degrees to the support column 4, generally across the diameter of the cowl. The motor lug 28 is mounted to an eye 18 formed in an inner end of the flange 14, on a surface 16 thereof. The support column 6 is formed and mounted in a manner similar to the support column 4.

The support columns 4 and 6 of FIGS. 1 and 2 are suitable for use with the invention, for mounting a motor. However, the cowling arrangement of the present invention differs dramatically from that described with respect to FIGS. 1 and 2.

According to the present invention, a novel mounting structure for a propulsion unit (e.g., ducted fan motor) is provided, especially for scale model airplanes.

FIGS. 3-8 show the motor-mounting technique of the present invention

Figure 3:
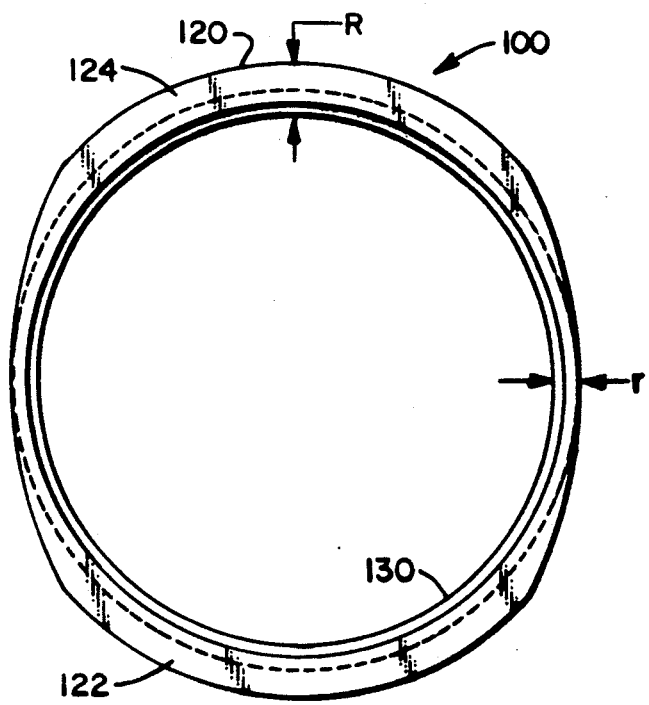
FIG. 3 is an end view of a cowl for mounting a motor, according to the present invention.
Figure 4:
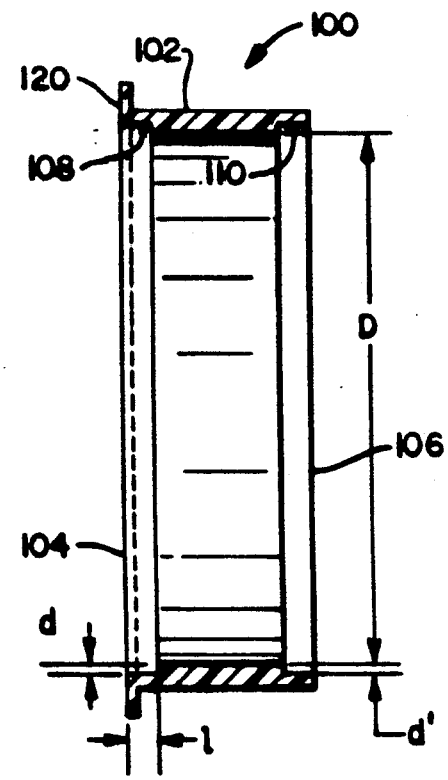
FIG. 4 is a cross-sectional view of the cowl of FIG. 3.

FIGS. 3 and 4 show a cowling 100 for mounting in the fuselage of a scale model airplane (not shown). The cowling 100 has a generally cylindrical body 102, is formed of plastic, has a front end 104 and a rear end 106, and is suitable for receiving the body of a model airplane motor (engine) having a generally cylindrical exterior shape, such as a ducted-fan type motor.

The cowling 100 has a cylindrical bore 130 of diameter "D" extending through the cowl body 102, between its front and rear ends.

A front region 108 of the bore 130, extending from the front end 104 partially (approximately 10-15%) through the cowl body 102 a distance "l" towards the rear end 106, is enlarged by a small amount "d", to accommodate insertion of a cylindrical sleeve 300 of thickness "t", described hereinbelow.

Preferably, a rear region 110 of the bore 130, extending from the rear end 106 partially (approximately 10-15%) through the cowl body 102 towards the front end 104 is similarly enlarged by a small amount "d'", approximately equal to "d", to receive an exhaust channel (exhaust pipe; not shown) of thickness approximately equal to "d'".

A radial flange 120 is provided at the front end 104 of the cowling 100. As shown in FIG. 1, the flange 120 extends perpendicularly to the longitudinal axis of the cylindrical cowling 100, and protrudes beyond the outer dimension of the cowling body 102. As shown in FIG. 1, the flange 120 suitably projects beyond the cowling body 102 a maximum distance (breadth) "R" at points in diametrically opposed regions 122 and 124 — each maximum breadth region 122 and 124 of the radial flange 120 circumscribing about 90° of the cowling body. The breadth of the radial flange 120 decreases between these points, to a minimum breadth "r", which may be zero (not extending beyond the cowl body at all), at intermediate (midway) diametrically opposed points about the circumference of the cowl body. Although not shown, it is, however, also possible to form the flange 120 as an annular ring of constant dimension "R".

Figure 5:
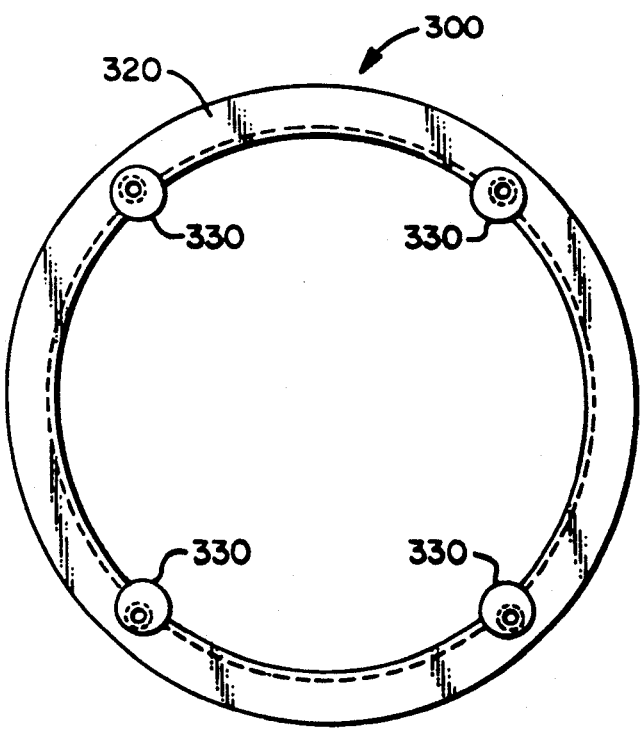
FIG. 5 is an end view of a sleeve for cooperating with the cowl of FIG. 3, according to the present invention.
Figure 6:
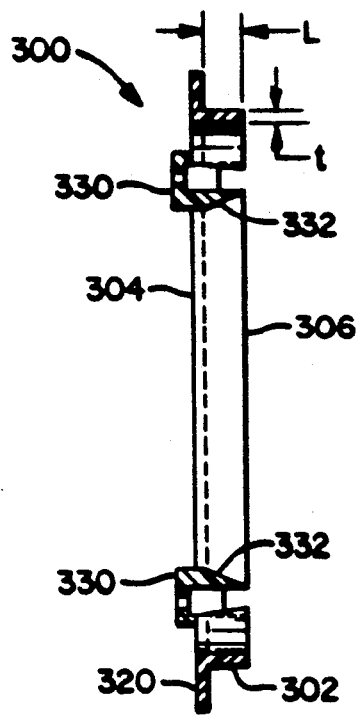
FIG. 6 is a cross-sectional view of the sleeve of FIG. 5.

FIGS. 5 and 6 show a sleeve 300 that is insertable into the cowling 100. More particularly, the sleeve 300 has a generally cylindrical body 302 of thickness "t", of inner diameter preferably nearly exactly equal to the diameter "D" of the cowling 100, is formed of plastic, and has a front end 304 and a rear end 306.

The thickness "t" of the sleeve body 302 is preferably established to be nearly exactly equal to the enlargement "d" of the region 108 of increased thickness in the cowl body 102, so that when the sleeve body 302 is inserted into the region 108 of the cowl body 102, a smooth bore of diameter "D" is formed with respect to the sleeve 300 and cowl (cowling) 100. Taking into account an exhaust pipe (not shown) inserted into the rear region 110 of the cowling 100, a smooth bore of dimension "D" continues to exhaust the gases from the motor.

A radial flange 320 is formed about the front end 304 of the sleeve body 302, in a manner similar to that of the flange 120 of the cowl body, except that the sleeve flange 320 is shown extending a constant breadth beyond the sleeve body.

Disregarding (not taking into account) the small portion of the end 304 of the sleeve body 302 that is occupied by the flange 320, the sleeve body has a length "L", greater than the depth "l" of the region 108 of increased cowl bore diameter. As will become evident, the dimension "L" is selected to be a predetermined amount greater than the dimension "l", so that when the sleeve is inserted into the cowl, a gap measuring L-l remains between their respective flanges.

The front end of the sleeve 300 is provided with four lugs (accommodations) 330 disposed at suitable intervals around the flange 320 for receiving support columns (see, e.g., the support columns 4 and 6 of FIG. 1), to which support columns a motor (propulsion unit) is mounted in any suitable manner. Shown in greater detail in FIG. 8, these four lugs 330 are suitably formed as separate elements from the flange (rim) 320, and are suitably provided with threaded holes for receiving a screw (bolt) extending through the lugs at the ends of the respective support columns. For securing the lugs 330 in place in the sleeve, the lugs 330 are provided with tapered protrusions 332 (see also FIG. 8) which bear on the inner diameter of the cylindrical sleeve and are tapered to favor the flow of air caused by the motor.

Figure 7:
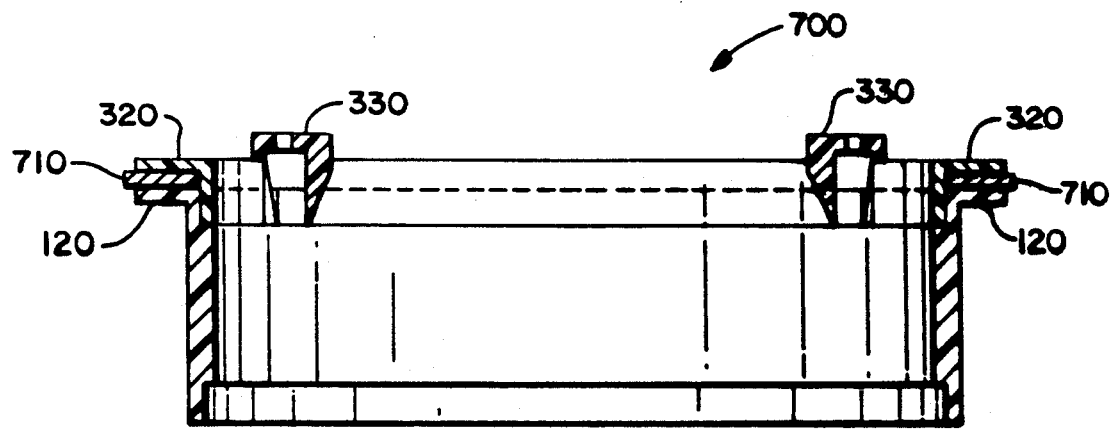
FIG. 7 is a cross-sectional view of the sleeve of FIGS. 5 and 6 mounted to the cowl of FIGS. 3 and 4, illustrating how they create a gap for receiving a fuselage round-frame-rib, according to the present invention.
Figure 8:
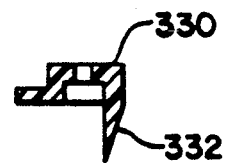
FIG. 8 is a detailed view of an element of the sleeve of FIGS. 5 and 6.

FIG. 7 shows the sleeve 300 assembled to the flange 100, forming an overall "mounting structure 700 for mounting a propulsion unit in an airplane fuselage. Of particular note is a gap formed between the flanges 120 and 320 of the respective cowl and sleeve, said gap being of a dimension L-l (as discussed hereinabove) for securely receiving a round-frame-rib member 710 of a scale model airplane. (FIG. 7 being a cross-section, the rib 710 appears as two rectangular segments in the Figure, representing an axial cross-section of a ring-shaped rib.) Of further note is the fact that the sleeve element fits without a bore gap into to the cowl element. This is important with regard to airflow created by the motor, which must flow through the bores in the respective sleeve and cowl.

The cowl and sleeve can be firmly attached to the rib 710 by an adhesive disposed on the rib-facing surfaces of the respective cowl and sleeve flanges 120 and 320. Or, the flanges could be provided with suitable holes for using a suitable hardware element (bolt or screw) for firmly securing the mounting structure 700 to the rib 710. In this manner, using either securement technique, a round-frame rib 710 or similar structural component of a scale model aircraft fuselage may be tightly received without play.

Appended hereto and forming part of the disclosure of this specification is a document entitled MOUNTING STRUCTURE FOR A PROPULSION UNIT IN AN AIRPLANE.

What is claimed is:

1. A mounting structure for mounting a propulsion unit in a fuselage of a model airplane, the propulsion unit having a motor with a fan, which motor is fixed to a generally cylindrical cowl by means of support columns, comprising:

a cowl having a generally cylindrical body, an end at one end of said body, a bore of diameter "D" extending through the body from the end of the body, a region of length "l" and of increased diameter "D+d" extending into the bore from the end of the body and having a diameter greater than that of the bore, and a first flange extending radially from the end of the cowl body;

a cylindrical sleeve having a generally cylindrical body of thickness "t" and having an inner diameter "D", adapted to be partially inserted into the end of the cowl body in the region of increased diameter in the cowl body, having an end, and having a second radial flange extending radially from the end of the sleeve body, the bore of the cowl limiting further insertion of the sleeve into the cowl, thereby forming a gap between the first radial flange and the second radial flange, the gap suitable for receiving a round-frame rib of an airplane fuselage for connecting a propulsion unit to the airplane fuselage;

wherein:

the first flange of the cowl extends radially from the body of the cowl a maximum breadth "R" at first diametrically opposed points on the cowl, and extends radially from the body of the cowl a minimum breadth "r" (r<R) at points between the first diametrically opposed points.

2. A mounting structure according to claim 1, wherein:

said cowl and said sleeve have identical inner diameters "D";

the sleeve body has a length "L" longer than "l" and is insertable into the cowl in the region of increased diameter to a depth "l", at which point the lesser bore diameter "D" of the cowl prevents further insertion of the sleeve into the cowl; and the thickness "t" of the sleeve is approximately equal to the amount "d" by which the region of increased diameter in the cowl is larger than the diameter "D" of the cowl bore.

3. A mounting structure according to claim 1, wherein:

the first flange of the cowl extends radially from the body of the cowl a minimum breadth "r" (r<R) at second diametrically opposed points between the first diametrically opposed points.

4. A mounting structure according to claim 1, wherein:

the first flange of the cowl extends radially from the body of the cowl a maximum breadth "R" at first diametrically opposed circumferential regions of the cowl, said regions each extending circumferentially approximately ninety degrees about the circumference of the cowl body.

5. A mounting structure according to claim 1, wherein:

in second diametrically opposed regions between the first diametrically opposed regions, the breadth of the first flange of the cowl continuously decreases from the full breadth to a minimum breadth approximately equal to zero.

6. A mounting structure according to claim 1, further comprising:

means for fixing the propulsion unit to the sleeve.

7. A mounting structure according to claim 6, wherein the means for fixing comprises:

two parallel, spaced-apart support columns spanning chordwise the end of the sleeve;

means for fixing the propulsion unit to the support columns.

8. A mounting structure according to claim 7, wherein said means for fixing the propulsion unit to the support columns comprises:

eyes on the support columns; and lugs on the propulsion unit at locations corresponding to said eyes.

* * * * *